United States Patent
Levola et al.

(10) Patent No.: US 11,119,262 B1
(45) Date of Patent: Sep. 14, 2021

(54) OPTICAL DEVICE, DISPLAY DEVICE, AND METHOD FOR OUTPUTTING LIGHT AND DISPLAYING IMAGE THEREOF

(71) Applicant: SHENZHEN OPTIARK SEMICONDUCTOR TECHNOLOGIES LIMITED, Shenzhen (CN)

(72) Inventors: Tapani Kalervo Levola, Shenzhen (CN); Houqiang Jiang, Shenzhen (CN); Yisheng Zhu, Shenzhen (CN)

(73) Assignee: SHENZHEN OPTIARK SEMICONDUCTOR TECHNOLOGIES LIMITED, Shenzhen (CN)

( * ) Notice: Subject to any disclaimer, the term of this patent is extended or adjusted under 35 U.S.C. 154(b) by 0 days.

(21) Appl. No.: 16/927,939

(22) Filed: Jul. 13, 2020

(30) Foreign Application Priority Data

Jun. 19, 2020 (CN) .......................... 202010565684.5

(51) Int. Cl.
*F21V 8/00* (2006.01)
*G02B 6/35* (2006.01)
*F21V 7/00* (2006.01)

(52) U.S. Cl.
CPC .......... *G02B 6/0011* (2013.01); *F21V 7/0091* (2013.01); *G02B 6/3522* (2013.01)

(58) Field of Classification Search
CPC .... G02B 6/0011; G02B 6/3522; F21V 7/0091
See application file for complete search history.

(56) References Cited

U.S. PATENT DOCUMENTS

2014/0160577 A1* 6/2014 Dominici ............ G02B 6/0035
359/633

* cited by examiner

*Primary Examiner* — Joseph L Williams

(57) ABSTRACT

A optical device includes a waveguide plate, which includes an in-coupling element to form first guided light (B1) and a second guided light (B2) by diffracting input light (IN1), an expander element to form third guided light (B3) by diffracting the first guided light (B1), an out-coupling element to form first output light (OB3) by diffracting the third guided light (B3), a bypass element to form fourth guided light (B4) by diffracting the second guided light (B2), wherein the first guided light (B1) propagates in a first direction, the second guided light (B2) propagates in a second direction, and the angle γ12 between the first direction) and the second direction is in the range of 60° to 120°, wherein the out-coupling element includes one or more augmenting regions.

18 Claims, 6 Drawing Sheets

OPTICAL DEVICE, DISPLAY DEVICE, AND METHOD FOR OUTPUTTING LIGHT AND DISPLAYING IMAGE THEREOF

CROSS REFERENCE OF RELATED APPLICATIONS

This application claims the benefit of Chinese Patent Application No. 202010565684.5, having the title of "OPTICAL DEVICE, DISPLAY DEVICE, AND METHOD FOR OUTPUTTING LIGHT AND DISPLAYING IMAGE THEREOF", filed on Jun. 19, 2020, the contents of which are incorporated herein by reference.

TECHNICAL FIELD

The present invention relates to an optical device, a display device and a method for outputting light and displaying image.

BACKGROUND ART

Referring to FIG. 1, an expander device 1 comprises a waveguide plate 101, which in turn comprises a diffractive in-coupling element 102, a diffractive expander element 103, and a diffractive out-coupling element 104. The expander device 1 forms an output light beam OUT1 by diffractively expanding light of an input light beam IN1. The in-coupling element 102 forms first guided light B1 by diffracting input light IN1. The expander element 103 forms expanded guided light B3 by diffracting the first guided light B1. The out-coupling element 104 forms output light OUT1 by diffracting the expanded guided light B3.

The expander device 1 may expand a light beam in two transverse directions, in the direction SX and in the direction SY. The width of the output light beam OUT1 is greater than the width of the input light beam IN1. The expander device 1 may be arranged to expand a viewing pupil of a virtual display device, so as to facilitate positioning of an eye 5 with respect to the virtual display device. A human observer may see a displayed virtual image in a situation where the output light is arranged to impinge on an eye 5 of the human viewer. The output light may comprise one or more output light beams, wherein each output beam may correspond to a different image point of a displayed virtual image. The expander device may also be called e.g. as an exit pupil extender.

The intensity of the guided light (B1, B3) propagating within the plate 101 may decrease with increasing path length from the in-coupling element 11. The guided light may also experience a high number of consecutive diffractions within the expander element 103, depending on the path length. The output intensity at the most distant (leftmost) corner region 6 may be low due to long optical path from the in-coupling element 102 to said corner region 6. In addition, multiple consecutive diffractions in the expander element 103 may further reduce intensity.

Consequently, the intensity of the output light at the most distant corner region 6 of the out-coupling element 104 may be substantially lower than the intensity of the output light at the center 803 of the out-coupling element 104. The spatial intensity distribution of the output light of the comparative expander device 1 of FIG. 1 may be non-uniform.

SUMMARY OF THE INVENTION

An object is to provide an expander device. An object is to provide a method for expanding a light beam. An object is to provide a display device. An object is to provide a method for displaying an image.

According to an aspect, there is provided an optical beam expander device (2) comprising:
a waveguide plate (201), which comprising:
an in-coupling element (202) to form first guided light (B1) and second guided light (B2) by diffracting input light (IN1),
an expander element (203) to form third guided light (B3) by diffracting the first guided light (B1),
an out-coupling element (204) to form first output light (OB3) by diffracting the third guided light (B3),
a bypass element (205) to form fourth guided light (B4) by diffracting the second guided light (B2),
wherein the first guided light (B1) propagates in a first direction (301), the second guided light (B2) propagates in a second direction (302), and the angle $\gamma_{12}$ between the first direction (301) and the second direction (302) is in the range of 60° to 120°,
wherein the out-coupling element (204) comprises one or more augmenting regions (401, 402) to form auxiliary output light (AUX3) by diffracting the fourth guided light (B4).

The scope of protection sought for various embodiments of the invention is set out by the independent claims. The embodiments, if any, described in this specification that do not fall under the scope of the independent claims are to be interpreted as examples useful for understanding various embodiments of the invention.

The expander device comprises a by-pass element and one or more augmenting regions to equalize spatial intensity distribution of the output light.

The expander device may split input light to propagate to the out-coupling element via a main route and via a by-pass route. Auxiliary light propagating along the by-pass route may at least partly compensate an uneven intensity distribution of the light, which propagates along the main route. The expander device may be arranged to separate a part of input light and divert the separated part via a by-pass route to the one or more augmenting regions. The augmenting regions may be special regions of the out-coupling element. The in-coupling element may diffract guided light to the by-pass element, wherein said by-pass element may diffract guided light to the one or more augmenting regions of the out-coupling element.

The augmenting regions may form auxiliary out-coupled light to equalize the spatial intensity distribution. A first augmenting region may form first out-coupled light by diffracting light received from the expander element, and the first augmenting region may also form auxiliary out-coupled light by diffracting auxiliary light received from the by-pass element. The auxiliary out-coupled light may spatially overlap the first out-coupled light. The first augmenting region may combine the auxiliary out-coupled light with the first out-coupled light, so as to provide a substantially even spatial intensity distribution for output light. The one or more augmenting regions and one or more by-pass elements may homogenize the output intensity distribution of the expander device.

In an embodiment, a first augmenting region may comprise first diffractive features to diffract guided light received from the expander element, and the first augmenting region may comprise second diffractive features to diffract guided light received from the by-pass element. The first diffractive features may have a first orientation and the second diffractive features may have a second different orientation. The first diffractive features may have low or negligible efficiency for coupling light received from the by-pass element out of the waveguiding plate. The second diffractive features may have low or negligible efficiency for coupling light received from the expander element out of the waveguiding plate.

BRIEF DESCRIPTION OF THE DRAWINGS

In the following examples, several variations will be described in more detail with reference to the appended drawings, in which.

DETAILED DESCRIPTION OF EMBODIMENTS

Figure 1:
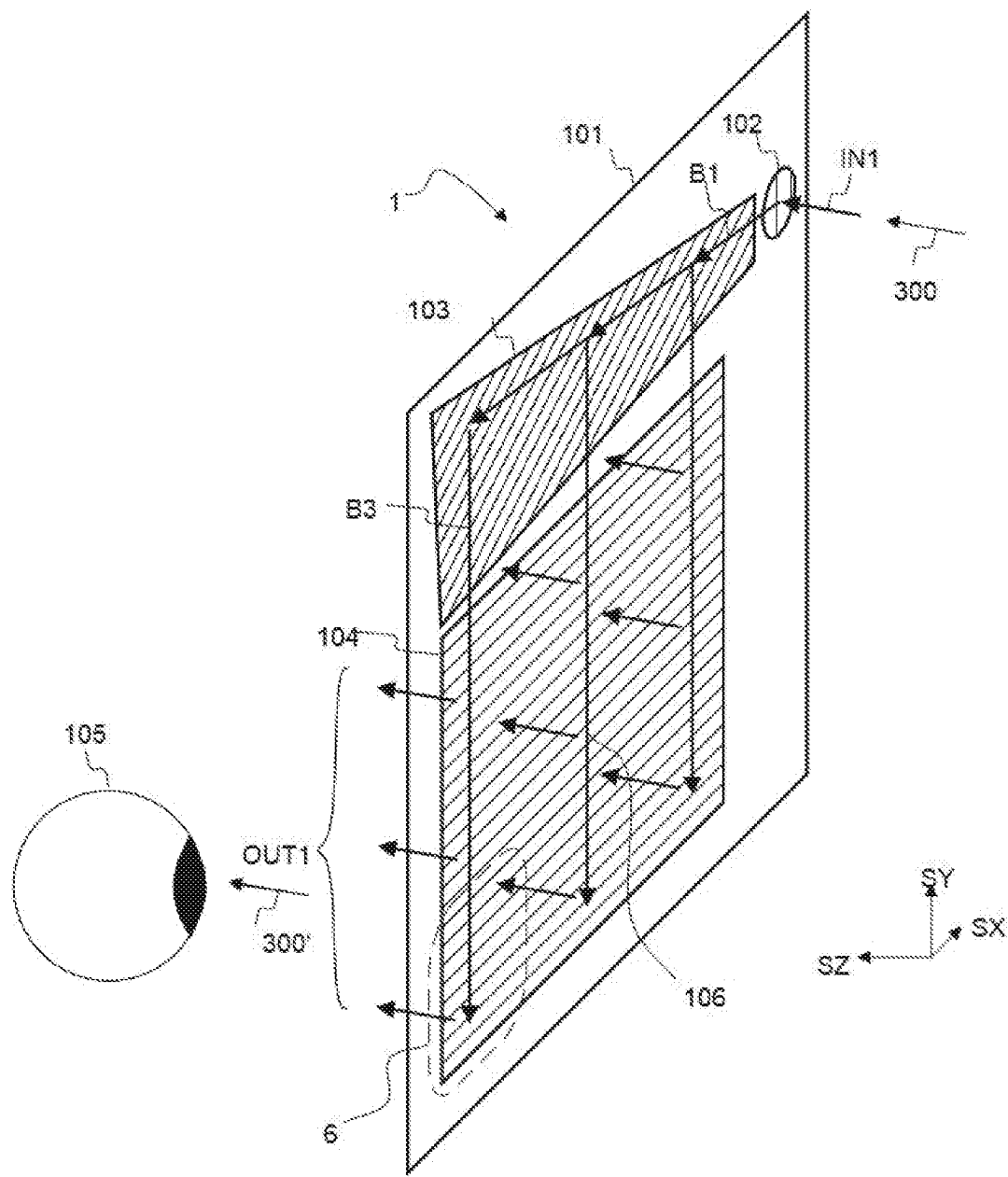
FIG. 1 shows, as a comparative example, an expander device.
Figure 2:
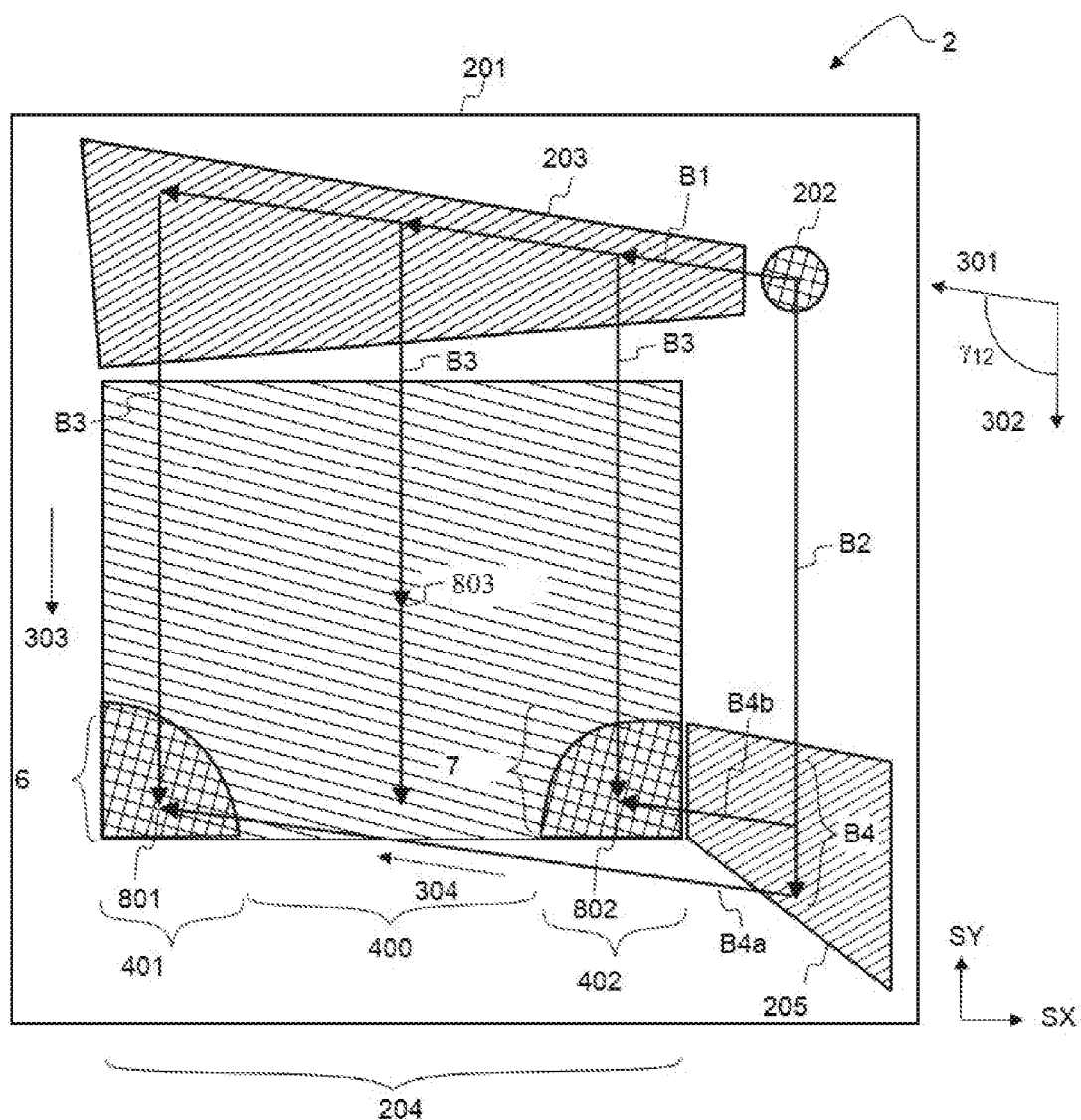
FIG. 2 shows, by way of example, in a front view, an expander device, which comprises a by-pass element to couple light to augmenting regions.

Referring to FIG. 2, the expander device 2 may comprise a substantially planar waveguide plate 201, which in turn may comprise a first diffractive optical in-coupling element 202, a second diffractive optical expander element 203, a third diffractive optical out-coupling element 204, and a fourth diffractive optical by-pass element 205.

The in-coupling element 202 may receive an input light beam IN1, and the out-coupling element 204 may provide an expanded output light beam OUT1 such that the width of the output light beam OUT1 is greater than the width of the input light beam IN1.

The expander device 2 may expand a light beam IN1 in two dimensions (e.g. in the horizontal direction SX and in the vertical direction SY). The expansion process may also be called as exit pupil expansion. The expander device 2 may be called as a beam-expander device or as an exit pupil expander.

The first element 202 may operate as an in-coupling element. The first element 202 may form first guided light B1 and second guided light B2 by diffracting input light IN1. The first guided light B1 and the second guided light B2 may be waveguided within the planar waveguide plate 201. The first guided light B1 and second guided light B2 may be confined to the plate 201 by total internal reflection.

The term "guided" may mean that the light propagates within the planar waveguide plate 201 so that the light is confined to the plate by total internal reflection (TIR). The term "guided" may mean the same as the term "waveguided".

The first guided light B1 and the second guided light B2 may have the same wavelength XO. The first element 202 may couple the input light IN1 to propagate to the out-coupling element 204 via two different routes, i.e. via a main route and via a by-pass route.

The in-coupling element 202 may be optically coupled to the out-coupling element 204 via the expander element 203. The expander device 2 may provide a main route from the element 202 via the element 203 to the element 204.

The in-coupling element 202 may be optically coupled to the out-coupling element 204 also via the by-pass element 205. The expander device 2 may provide a by-pass route from the element 202 via the element 205 to the element 204.

The second element 203 may operate as an expander element. The first guided light B1 may propagate from the first in-coupling element 202 to the expander element 203 in a first direction 301. The expander element 203 may form an expanded guided light B3 by diffracting the first guided light B1. The expanded guided light B3 may propagate from the expander element 203 to the out-coupling element 204. The expanded guided light B3 may be confined to the plate 201 by total internal reflection. In an embodiment, the expander element 203 may be arranged to distribute the light B3 substantially to the whole area of the out-coupling element 204.

The third element 204 may operate as an out-coupling element. The out-coupling element 204 may form output light OB3 by diffracting the expanded guided light B3.

The fourth element 205 may operate as a by-pass element. The second guided light B2 may propagate from the first in-coupling element 202 to the by-pass element 205 in a second direction 302.

The direction 301 may mean the average propagation direction of the guided light B1. The direction 301 may denote the central axis of propagation of the guided light B1.

The direction 302 may mean the average propagation direction of the guided light B2. The direction 302 may denote the central axis of propagation of the guided light B2.

The angle γ12 between the first direction 301 and the second direction 302 may be e.g. in the range of 60° to 120°.

The by-pass element 205 may form guided auxiliary light B4 by diffracting the second guided light B2. The guided auxiliary light B4 may be confined to the plate 201 by total internal reflection. Wherein the guided auxiliary light B4 comprises a fifth guided light B4a and a sixth guided light B4b.

The out-coupling element 204 may comprise one or more augmenting regions 401, 402. The one or more augmenting regions 401, 402 may couple the guided auxiliary light B4 out of the plate 201 by diffraction. The one or more augmenting regions 401, 402 may form output augmenting light AUX3 by diffracting the guided auxiliary light B4.

A first augmenting region (401 or 402) may diffract guided light B3 received from the expander element 204 and said first augmenting region may also simultaneously diffract guided light B4 received from the by-pass element 204.

The expanded guided light B3 may propagate in a third direction 303, which may be e.g. substantially parallel with the second direction 302. The auxiliary light B4 may propagate in a fourth direction 304, which may be e.g. substantially parallel with the first direction 301.

The main route may mean an optical path from the in-coupling element 202 to the out-coupling element 204 via the expander element 203.

The by-pass route may mean an optical path from the in-coupling element 202 to an augmenting region 401 or 402 via the by-pass element 205.

In an embodiment, the expander device 2 may be arranged to operate such that the second guided light B2 does not propagate via the out-coupling element 204.

The out-coupling element 204 may comprise one or more reference regions 400, 400 which do not diffract the fourth guided light B4 out of the waveguide plate 201. The total area of the reference regions 400 may be e.g. in the range of 30% to 95% of the area of the out-coupling element 204.

The out-coupling element 204 may comprise a reference region 400 and one or more augmenting regions 401, 402. The reference region 400 may provide out-coupled light OB3 by diffracting guided light B3. The augmenting regions 401, 402 may provide out-coupled light OB3 by diffracting guided light B3, and the augmenting regions 401, 402 may also provide auxiliary out-coupled light AUX3 by diffracting guided light B4. The reference region 400 may also be called e.g. as a normal out-coupling region or as a first out-coupling region.

In an embodiment, at least part of the fourth guided light B4, for example the fifth guided light B4a, may propagate from the by-pass element 205 to a first augmenting region 401 without passing through a reference region 400. The other part of the fourth guided light B4, for example the sixth guided light B4b, may propagate form the by-pass elements 205 to the adjacent second augmenting region 402. The reference region 400 may be a region of the out-coupling element 204 which does not diffract the fourth guided light B4 out of the waveguide plate 201.

SX, SY and SZ denote orthogonal directions. The plate 201 may be parallel with a plane defined by the directions SX and SY. 801 may denote a position in a first corner region 6 of the out-coupling element 204. The first corner region 6 may be a corner region which has the longest path length from the in-coupling element 202, when compared with the other corner regions of the out-coupling element 204. POS3b may denote a position in a second corner region 7 of the out-coupling element 204. The second corner region 7 may be closest to the by-pass element 205. 803 may denote a position in the center of the out-coupling element 204.

Figure 3:
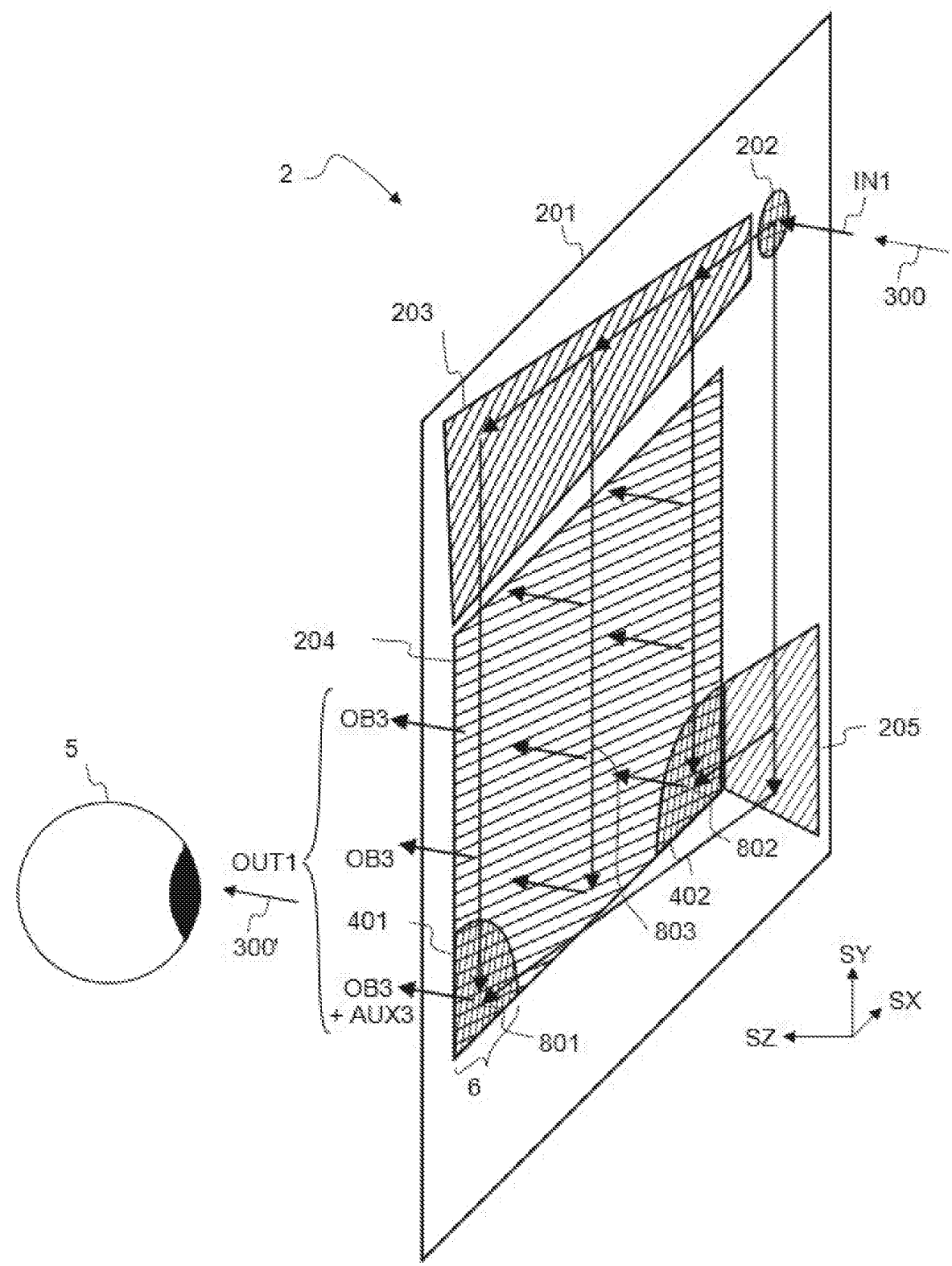
FIG. 3 shows, by way of example, in a three-dimensional view, the expander device.

Referring to FIG. 3, the expander device 2 may comprise one or more augmenting regions 401, 402 and a by-pass element 205 to equalize spatial intensity distribution of the output light beam OUT1. For example, the by-pass element 205 and the augmenting regions 401, 402 may be arranged to provide auxiliary light AUX3 such that the intensity of the output light beam OUT1 at a most distant corner region 6 of the out-coupling element 204 may be substantially equal to the intensity of the output light beam OUT1 at the center 803 of the out-coupling element 204. The most distant corner region 6 may have the longest optical path length from the in-coupling element 202.

The expander device 2 may provide the output beam OUT1 such that optical intensity ($I_{801}$) of the output beam OUT1 at a first transverse position (801) is substantially equal to the intensity ($I_{803}$) of the output beam OUT1 at a second transverse position (803). The relative difference ($I_{803}-I_{801}$)/$I_{803}$ between the intensity (150) at the second transverse position (803) and the intensity ($I_{801}$) at the first transverse position (801) may be e.g. smaller than 30%, advantageously smaller than 10%. The first transverse position 801 may e.g. be in the corner region 6. The second transverse position 803 may be e.g. in the center of the out-coupling element 204.

An input light beam IN1 may have a direction of propagation 300. The input light beam IN1 may correspond e.g. a single image point of a displayed image.

The expander device 2 may form an output light beam OUT1 from light of the input light beam IN1 such that the output light beam OUT1 has a direction of propagation 300'. The expander device 2 may be arranged to form the output light beam OUT1 from light of the input light beam IN1 such that the direction 300' of the output light beam OUT1 is parallel with the direction 300 of said input light beam IN1. The grating periods (d) and the orientations (β) of the diffraction gratings of the optical elements 202, 203, 204 may be selected such that direction 300' of the output light beam OUT1 is parallel with the direction 300 of the input light beam IN1.

Figure 4:
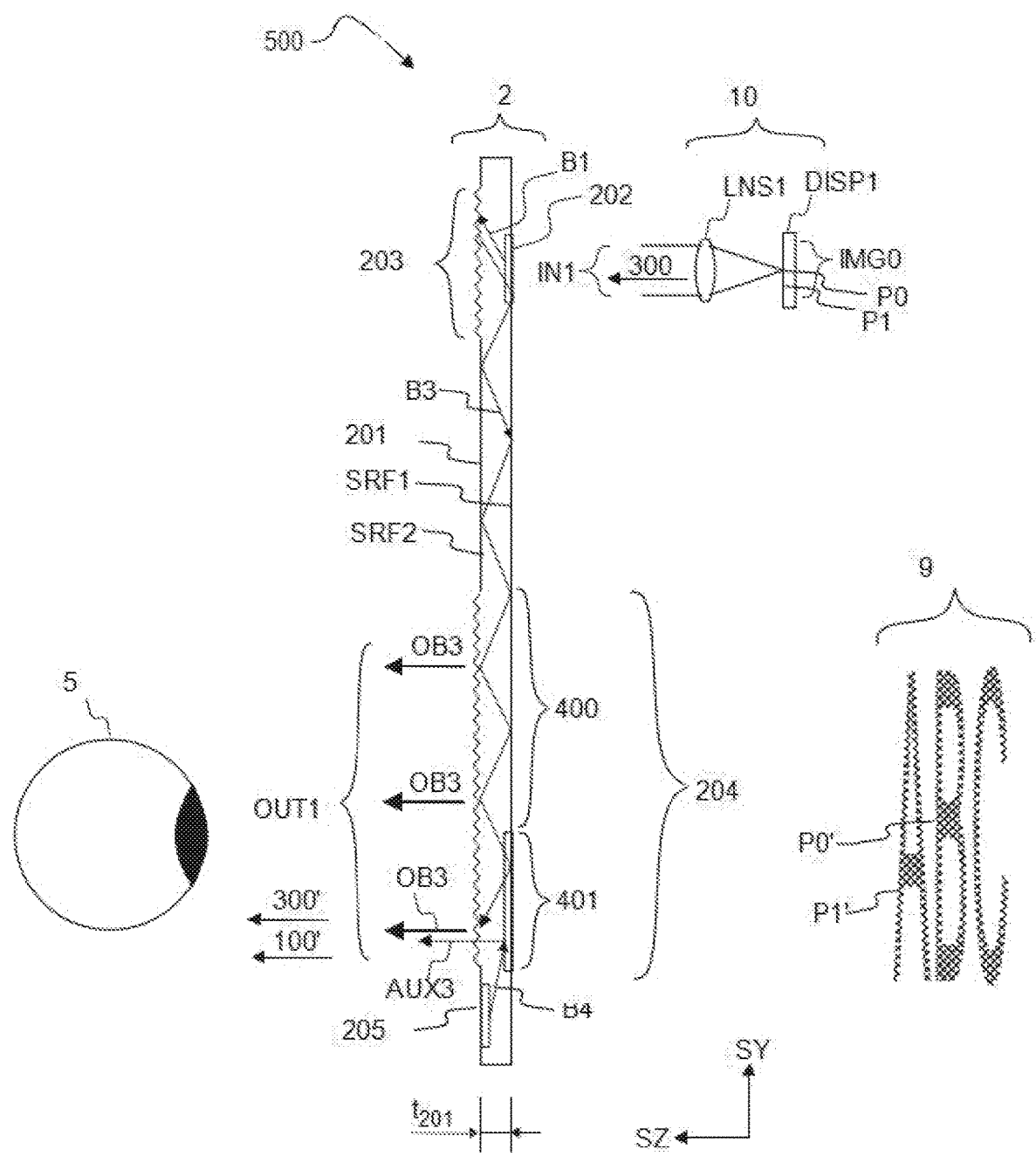
FIG. 4 shows, by way of example, in cross-sectional side view, a display apparatus, which comprises the expander device.

Referring to FIG. 4, a display device 500 may comprise the expander device 2 and an optical light engine 10. The display apparatus 500 may comprise an optical engine 10 to form a primary image IMG0 and to convert the primary image IMG0 into a plurality of input light beams IN1. The engine 10 may be optically coupled to the in-coupling element 202 of the expander 2. Said plurality of input light beams IN1 may be optically coupled to the in-coupling element 202 of the expander device 2. The apparatus 500 may be e.g. display device for displaying virtual images. The apparatus 500 may be a near eye optical device. The expander device 2 may carry virtual image content from the light engine 10 to the front of a user's eye 5. The expander device 2 may expand the viewing pupil, thus enlarging the eye box.

The engine 10 may comprise a micro-display DISP1 to generate a primary image IMG0. The micro-display DISP1 may comprise a two-dimensional array of light-emitting pixels. The display DISP1 may generate a primary image IMG0 e.g. at a resolution of 1920×1080 (Full HD). The display DISP1 may generate a primary image IMG0 e.g. at a resolution of 3840×2160 (4K UHD). The primary image IMG0 may comprise a plurality of image points P0, P1. The engine 10 may comprise collimating optics LNS1 to form a different light beam from each image pixel. The engine 10 may comprise collimating optics LNS1 to form a substantially collimated light beam from light of an image point P0. The light beam corresponding to the image point P0 may propagate in the direction 300. A light beam corresponding to a different image point P1 may propagate in a direction which is different from the direction 300. The engine 10 may provide a plurality of light beams corresponding to the generated primary image IMG0. The one or more light beams provided by the engine 10 may be coupled to the expander 2 as input light IN1.

The engine 10 may comprise e.g. one or more light emitting diodes (LED). The display DISP1 may comprise e.g. one or more micro display imagers, such as liquid crystal on silicon (LCOS), liquid crystal display (LCD), digital micromirror device (DMD).

The first augmenting region (401 or 402) may form a first output beam component OB3 by diffracting guided light B3 received from the expander element 203. The first augmenting region (401 or 402) may form a second auxiliary output beam component AUX3 by diffracting guided light B4 received from the by-pass element 205. The first augmenting region (401 or 402) may form output light OUT1 by combining the second output beam component AUX3 with the first output beam component OB3.

The first output beam component OB3 may propagate in a direction 300'. The auxiliary output beam component AUX3 may propagate in a direction 100'. The expander device 2 may be arranged to operate such that the direction 100' of the auxiliary output beam component AUX3 is parallel with the direction 300' of the first output beam component OB3, in a situation where the first output beam component OB3 and the auxiliary output beam component AUX3 are formed from the same input light beam IN1, which corresponds to a single image point (e.g. P0). The output light beam OUT1 may be formed from an input beam IN1 such that the directions 300' and 100' are parallel with the direction 300 of the input beam IN1.

Each element 202, 203, 204, 205 may comprise one or more diffraction gratings to diffract light as described.

The grating periods (d), the orientations (β), and the grating vectors V of the optical elements 202, 203, 204, 205 may be selected such that direction 100' of the auxiliary output beam component AUX3 is parallel with the direction 300' of the first output beam component OB3.

The grating periods (d) and the direction (β) and the grating vectors V of the grating vectors may fulfill e.g. the condition that the vector sum of grating vectors of the elements 202, 205, and the grating vector of the region 401 is zero.

The grating periods (d) and the direction (β) and the grating vectors V of the grating vectors may fulfill e.g. the condition that the vector sum of grating vectors of the elements 202, 205, and the grating vector of the region 402 is zero.

The waveguiding plate may have a thickness $t_{201}$. The waveguiding plate comprises a planar waveguiding core. In an embodiment, the plate 201 may optionally comprise e.g. one or more cladding layers, one or more protective layers, and/or one or more mechanically supporting layers. The thickness $t_{201}$ may refer to the thickness of a planar waveguiding core of the plate 201.

The expander device 2 may expand a light beam in two transverse directions, in the direction SX and in the direction SY. The width (in direction SX) of the output light beam OUT1 may be greater than the width of the input light beam IN1, and the height (in direction SY) of the output light beam OUT1 may be greater than the height of the input light beam IN1.

The expander device 2 may be arranged to expand a viewing pupil of the virtual display device 500, so as to facilitate positioning of an eye 5 with respect to the virtual display device 500. A human observer may see a displayed virtual image 9 in a situation where the output light OUT1 is arranged to impinge on an eye 5 of the human viewer. The output light OUT1 may comprise one or more output light beams, wherein each output light beam may correspond to a different image point (P0', P1') of a displayed virtual image. The engine 10 may comprise a micro display for displaying a primary image IMG0. The engine 10 and the expander device 2 may be arranged to display the virtual image 9 by converting the primary image IMG0 into a plurality of input light beams LB1, and by forming output light beams OUT1 from the input beams IN1 by expanding the input beams IN1. The output light OUT1 may comprise a plurality of output light beams such that each output light beam may form a different image point (P0', P1') of the virtual image 9. The primary image IMG0 may be represent e.g. graphics and/or text. The primary image IMG0 may be represent e.g. video. The engine 10 and the expander device 2 may be arranged to display the virtual image 9 such that each image point (P0', P1') of the virtual image 9 corresponds to a different image point of the primary image IMG0.

Figure 5:
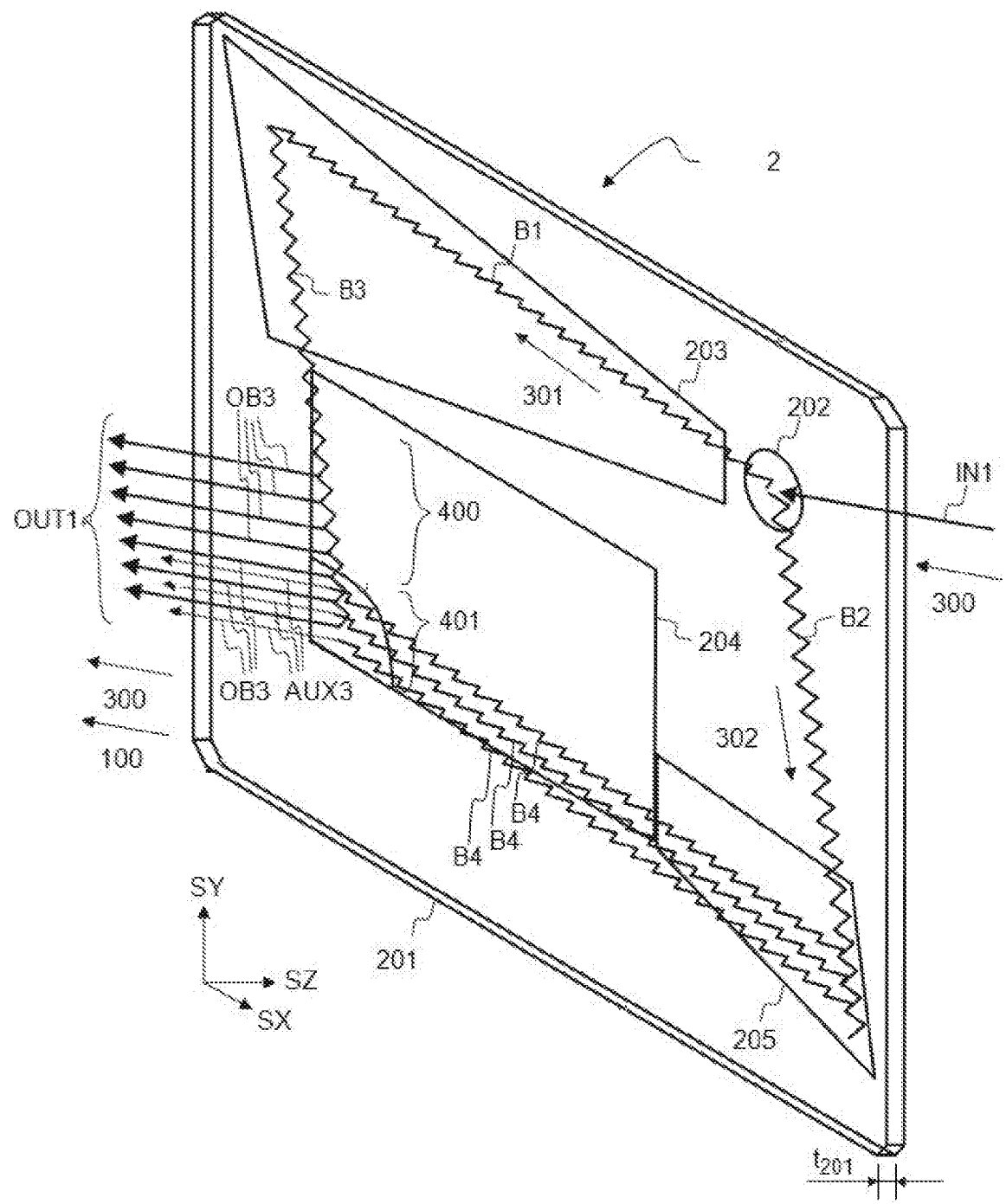
FIG. 5 shows, by way of example, in a three-dimensional view, forming output light by combining first out-coupled light with auxiliary out-coupled light.

FIG. 5 shows, by way of example, forming combined output light OUT1 by combining first output light OB3 with auxiliary output light AUX3.

The augmenting region 401 may form first output light OB3 by coupling guided light B3 out of the plate 201. The augmenting region 401 may form auxiliary output light AUX3 by coupling guided light B4 out of the plate 201. The augmenting region 401 may provide first output light OB3 and auxiliary output light AUX3 such that the auxiliary output light AUX3 overlaps the first output light OB3. The augmenting region 401 may combine the auxiliary output light AUX3 with the first output light OB3 such that the auxiliary output light AUX3 overlaps the first output light OB3. The augmenting region 401 may provide combined output light OUT1 by combining the auxiliary output light AUX3 with the first output light OB3.

The reference region 400 may form first output light OB3 by coupling guided light B3 out of the plate 201. The reference region 400 may operate such that the reference region 400 does not couple guided light B4 out of the plate 201.

Figure 6:
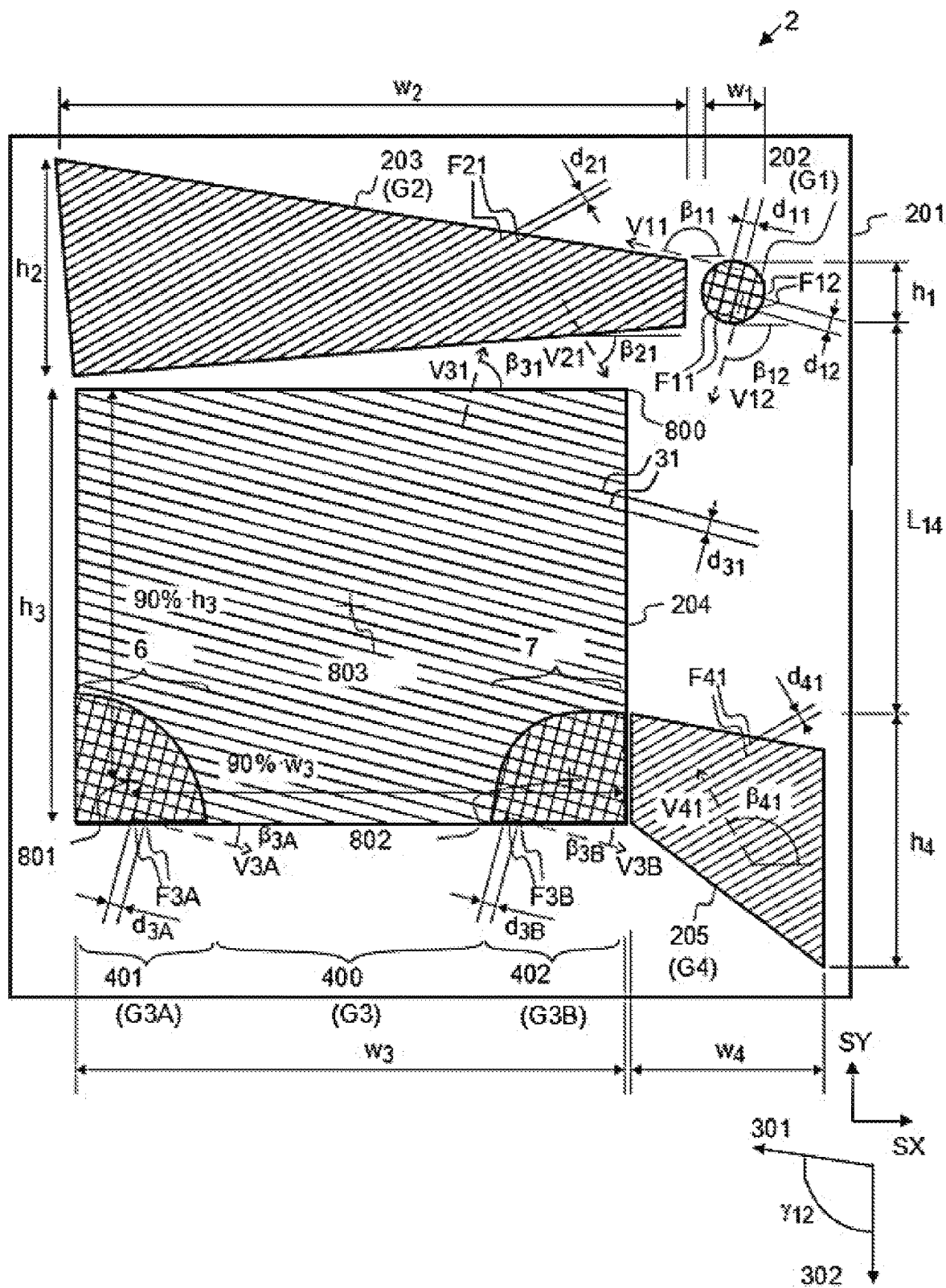
FIG. 6 shows, by way of example, in a front view, dimensions of the expander device.

Referring to FIG. 6, each element 202, 203, 204, and 205 may comprise one or more diffraction gratings to diffract light as described. For example, the element 202 may comprise one or more gratings G1. For example, the element 203 may comprise one or more gratings G2. For example, the element 205 may comprise a grating G4. For example, the reference region 400 may comprise one or more gratings G3. For example, the augmenting region 401 may comprise one or more gratings G3A. For example, the augmenting region 402 may comprise one or more gratings G3B.

A grating period of a diffraction grating and the orientation of the diffractive features of the diffraction grating may be specified by a grating vector V of said diffraction grating. The diffraction grating comprises a plurality of diffractive features (F) which may operate as diffractive lines. The diffractive features may be e.g. microscopic ridges or grooves. The diffractive features may also be e.g. microscopic protrusions (or recesses), wherein adjacent rows of protrusions (or recesses) may operate as diffractive lines. The grating vector V may be defined as a vector having a direction perpendicular to diffractive lines of the diffraction grating and a magnitude given by $2\pi/d$, where d is the grating period.

The in-coupling element 202 may have grating vectors V11, V12. The expander element 203 may have a grating vector V21. The by-pass element 205 may have a grating vector V41. The reference region 400 may have a grating vector V31. The augmenting region 401 may have grating vectors V31, V3A. The augmenting region 402 may have grating vectors V31, V3B. The grating vector V11 has a direction β11 and a magnitude $2\pi/d_{11}$. The grating vector V12 has a direction β12 and a magnitude $2\pi/d_{12}$. The grating vector V21 has a direction β21 and a magnitude $2\pi/d_{21}$. The grating vector V31 has a direction β31 and a magnitude $2\pi/d_{31}$. The grating vector V41 has a direction β41 and a magnitude $2\pi/d_{41}$. The grating vector V3A has a direction β3A and a magnitude $2\pi/d_{3A}$. The grating vector V3B has a direction β3B and a magnitude $2\pi/d_{3B}$. The direction (β) of a grating vector may be specified e.g. by the angle between said vector and a reference direction (e.g. direction SX).

The grating periods (d) and the orientations (β) of the grating vectors V of the optical elements 202, 203, 204, 205 may be selected such that direction 100' of the auxiliary output beam component AUX3 is parallel with the direction 300' of the first output beam component OB3.

An angle between the directions of the grating vectors V12, V11 of the in-coupling element 202 may be e.g. in the range of 60° to 120°. The grating period $d_{12}$ of the element 202 may be substantially equal to the grating period $d_{11}$ of the element 202. The grating period $d_{12}$ of the element 202 may be equal to the grating period $d_{11}$ of the element 202.

The grating periods (d) and the direction (3) of the grating vectors (V11, V21, V31) may fulfill e.g. the condition that the vector sum of grating vectors (V11, V21, V31) of the elements 202, 203, 204 is zero. The grating periods $d_{11}$, $d_{21}$, $d_{31}$ and the directions β11, β21, β31 of the grating vectors V11, V21, V31 may be selected such that the vector sum of the grating vectors V11, V21, V31 is zero.

The grating periods (d) and the direction (β) of the grating vectors may fulfill e.g. the condition that the vector sum of grating vectors of the elements 202, 205, and the grating vector of the region 401 is zero.

The grating periods $d_{12}$, $d_{41}$, $d_{3A}$ and the directions β12, β41, β3A of the grating vectors V12, V41, V3A may be selected such that the vector sum of the grating vectors V12, V41, and V3A is zero.

The grating vector V3B may be parallel with the grating vector V3A. The grating period $d_{3B}$ may be equal to the grating period $d_{3A}$.

The grating periods (d) and the direction (β) of the grating vectors may fulfill e.g. the condition that the vector sum of grating vectors of the elements 202, 205, and the grating vector of the region 402 is zero.

The first element 202 may have a first grating vector V11 to form the first guided light B1 to the direction 301 and a second grating vector V12 to form the second guided light B2 to the direction 302. The first element 202 may have first diffractive features F11 to provide a first grating which has a grating period $d_{11}$ and an orientation β11 with respect to a reference direction SX. The first element 202 may have second diffractive features F12 to provide a second grating which has a grating period $d_{12}$ and an orientation β12 with respect to the reference direction SX. The first element 202 may be implemented e.g. by a cross grating or by two linear gratings. A first linear grating having features F11 may be implemented on a first side (e.g. on an input side SRF1) of the plate 201, and a second linear grating having features F12 may be implemented on the second side (e.g. on an output side SRF2) of the plate 201. The diffractive features may be e.g. microscopic ridges or microscopic protrusions.

The second element 203 may have a first grating vector V21 to form the third guided light B3 by diffracting the first guided light B1. The second element 203 may have diffractive features F21 to provide a grating G2 which has a grating period $d_{21}$ and an orientation β21 with respect to the reference direction SX.

The third element 204 may have a first grating vector V31 to couple the expanded light B3 out of the plate 201. The third element 204 may have diffractive features F31 to provide a grating G3 which has a grating period $d_{31}$ and an orientation β31 with respect to the reference direction SX.

The reference region 400 may have a first grating vector V31 to couple the expanded light B3 out of the plate 201. The reference region 400 may have diffractive features F31 to provide a grating G3A which has a grating period $d_{31}$ and an orientation β31 with respect to the reference direction SX.

In an embodiment, the out-coupling element 204 may comprise one or more reference regions 400 which do not diffract the fourth guided light B4 out of the waveguide plate 201.

In an embodiment, the reference region 400 may have low or negligible out-coupling efficiency for coupling the guided light B4 out of the plate 201. In an embodiment, the reference region 400 may have low or negligible out-coupling efficiency for the guided light propagating in the first direction 301.

For example, the out-coupling efficiency of the reference region 400 for coupling guided light propagating in the first direction 301 out of the plate in the viewing direction 300' may be e.g. lower than 10% of the out-coupling efficiency of the reference region 400 for coupling guided light propagating in the second direction 302 out of the plate in the viewing direction 300'.

The by-pass element 205 may have a first grating vector V41 to form guided light B4 by diffracting the second guided light B2. The by-pass element 205 may have diffractive features F41 to provide a grating G4 which has a grating period $d_{41}$ and an orientation β41 with respect to the reference direction SX.

The augmenting regions 401, 402 may have a first grating vector V31 to couple the expanded light B3 out of the plate 201. The augmenting regions 401, 402 may have diffractive features F31 to provide a grating which has a grating period $d_{31}$ and an orientation β31 with respect to the reference direction SX.

The augmenting regions 401, 402 may have a second different grating vector V3A, V3B to couple the guided light B4 out of the plate 201. The augmenting region 401 may have diffractive features F3A to provide a grating G3A which has a grating period $d_{3A}$ and an orientation β3A with respect to the reference direction SX. The augmenting region 402 may have diffractive features F3B to provide a grating G3B which has a grating period $d_{3B}$ and an orientation β3B with respect to the reference direction SX.

The augmenting regions 401, 402 may implemented e.g. by a cross grating or by two linear gratings. A first linear grating G3A having features F3A may be implemented on a first side (e.g. SRF1) of the plate 201, and a second linear grating G3 having features F31 may be implemented on the second side (e.g. SRF2) of the plate 201.

The augmenting regions 401, 402 may have a high out-coupling efficiency for coupling guided light B3 out of the plate 201, and the augmenting regions 401, 402 may have a high out-coupling efficiency for coupling guided light B4 out of the plate 201.

The out-coupling efficiency of the first augmenting region 401 for coupling guided light propagating in the first direction 301 out of the plate in the viewing direction 300' may be e.g. higher than 50% of the out-coupling efficiency of the first augmenting region 401 for coupling guided light propagating in the second direction 302 out of the plate in the viewing direction 300'.

$L_{14}$ may denote a distance between the in-coupling element 202 and the by pass element 205. The distance $L_{14}$ between the in-coupling element 202 and the by-pass element 205 may be e.g. in the range of 50% to 80% of the height $h_3$ of the out-coupling region 204.

The positions and dimensions of the elements 202, 204, 205 may be selected such that the second guided light (B2) does not interact with the out-coupling element 204 between the in-coupling element 202 and the expander element 203.

The device 2 may be arranged to operate such that the second guided light B2 does not propagate via the out-coupling element 204.

The first element 202 may have a width $w_1$ and a height $h_1$. The second element 203 may have a width $w_2$ and a height $h_2$. The third element 204 may have a width $w_3$ and a height $h_3$. The fourth element 205 may have a width $w_4$ and a height $h_4$. The width may denote a dimension in the direction SX, and the height may denote a dimension in the direction SY. The out-coupling element 204 may be e.g. substantially rectangular. The sides of the out-coupling element 204 may be aligned e.g. with the directions SX and SY.

The width $w_2$ of the expander element 203 may be substantially greater than the width $w_1$ of the in-coupling element 202. The width of an expanded guided light beam B3 may be substantially greater than the width of an input light beam IN1.

803 may denote the center of the out-coupling element 204. The position 800 may denote the point of the out-coupling element 204 which is closest to the in-coupling element 202. The position 801 may be in the most distant corner region 6 of the out-coupling element 204. The horizontal distance between the positions 800, 801 may be e.g. 90% of the width $w_3$ of the out-coupling element 204, and the vertical distance between the positions 800, 801 may be e.g. 90% of the height $h_3$ of the out-coupling element 204. The position POSb may be located in the second corner region 7, which is closest to the by-pass element 205.

The plate 201 may comprise or consist essentially of transparent solid material. The plate 201 may comprise e.g. glass, polycarbonate or polymethyl methacrylate (PMMA). The diffractive optical elements 202, 203, 204, 205 and 205 may be formed e.g. by molding, embossing, and/or etching. The elements 202, 203, 204, 205 may be implemented e.g. by one or more surface diffraction gratings or by one or more volume diffraction gratings.

In an embodiment, the input light IN1 may be substantially monochromatic and may have a wavelength $\lambda 0$. All light beams IN1, B1, B2, B3, B4, OUT1, OB3, and AUX1 may have the same wavelength $\lambda 0$.

The spatial distribution of diffraction efficiency may be optionally tailored by selecting the local elevation of the microscopic diffractive features F. The elevation of the microscopic diffractive features F of the out-coupling element 204 may be optionally selected so as to further homogenize the intensity distribution of the output light OUT1.

The display apparatus 500 may be e.g. a virtual reality device 500. The display apparatus 500 may be e.g. an augmented reality device 500. The display apparatus 500 may be a near eye device. The apparatus 500 may be a wearable device, e.g. a headset. The apparatus 500 may comprise e.g. a headband by which the apparatus 500 may be worn on a user's head. During operation of apparatus 500, the out-coupling element 204 may be positioned e.g. in front of the user's left eye 5 or right 5. The apparatus 500 may project output light OUT1 into the user's eye 5. In an embodiment, the apparatus 500 may comprise two engines 10 and/or two extender devices 2 to display stereo images. In an augmented reality device 500, the viewer may also see real objects and/or environment through the expander device 2, in addition to the displayed virtual images. The engine 10 may be arranged to generate still images and/or video. The engine 10 may generate a real primary image IMG0 from a digital image. The engine 10 may receive one or more digital images e.g. from an internet server or from a smartphone. The apparatus 500 may be a smartphone. The displayed image may be viewed by a human. The displayed image may also be viewed e.g. by an animal, or by a machine (which may comprise e.g. a camera).

For the person skilled in the art, it will be clear that modifications and variations of the devices and methods according to the present invention are perceivable.

The figures are schematic. The particular embodiments described above with reference to the accompanying drawings are illustrative only and not meant to limit the scope of the invention, which is defined by the appended claims.

The invention claimed is:

1. An optical device (2) comprising:
 a waveguide plate (201), which comprising:
 an in-coupling element (202) to form first guided light (B1) and second guided light (B2) by diffracting input light (IN1),
 an expander element (203) to form third guided light (B3) by diffracting the first guided light (B1),
 an out-coupling element (204) to form first output light (OB3) by diffracting the third guided light (B3),
 a bypass element (205) to form fourth guided light (B4) by diffracting the second guided light (B2),
 wherein the first guided light (B1) propagates in a first direction (301), the second guided light (B2) propagates in a second direction (302), and the angle ($\gamma 12$) between the first direction (301) and the second direction (302) is in the range of 60° to 120°,
 wherein the out-coupling element (204) comprises one or more augmenting regions (401, 402) to form auxiliary output light (AUX3) by diffracting the fourth guided light (B4).

2. The device according to claim 1, wherein the out-coupling element (204) comprises one or more reference regions (400) which do not diffract the fourth guided light (B4) out of the waveguide plate (201).

3. The device according to claim 2, wherein the third guided light (B3) propagates in a third direction (303), which is substantially parallel with the second direction (302), and wherein the fourth guided light (B4) propagates in a fourth direction (304), which is substantially parallel with the first direction (301).

4. The device according to claim 3, wherein a first augmenting region (401) is arranged to form first output light (OB3) by diffracting the third guided light (B3), to form auxiliary output light (AUX3) by diffracting the fourth guided light (B4), and to form combined output light (OUT1) by combining the auxiliary output light (AUX3) with the first output light (OB3).

5. The device according to claim 4, wherein a distance (L14) between the in-coupling element (202) and the by-pass element (205) is in the range of 50% to 80% of the height ($H_3$) of the out-coupling region (204).

6. The device according to claim 5, wherein the second guided light (B2) does not interact with the out-coupling element (204) between the in-coupling element (202) and the expander element (203).

7. The device according to claim 6, wherein the out-coupling element (204) comprises one or more reference regions (400) which do not diffract the fourth guided light (B4) out of the waveguide plate (201), wherein the total area of the reference regions (400) is in the range of 30% to 95% of the area of the out-coupling element (204).

8. The device according to claim 7, wherein at least part of the fourth guided light (134) propagates from the by-pass element (205) to a first augmenting region (401) without passing through a reference region (400) which does not diffract the fourth guided light (B4) out of the waveguide plate (201).

9. A display apparatus (500) comprising an optical engine (10) to form a primary image and to convert the primary image into a plurality of input light beams (IN1), the apparatus (500) comprising the device (2) according to claim 1 form output light beams (OUT1) by diffractively expanding the input light beams (IN1).

10. A display apparatus (500) comprising an optical engine (10) to form a primary image and to convert the primary image into a plurality of input light beams (IN1), the apparatus (500) comprising the device (2) according to claim 2 form output light beams (OUT1) by diffractively expanding the input light beams (IN1).

11. A display apparatus (500) comprising an optical engine (10) to form a primary image and to convert the primary image into a plurality of input light beams (IN1), the apparatus (500) comprising the device (2) according to claim 3 form output light beams (OUT1) by diffractively expanding the input light beams (IN1).

12. A display apparatus (500) comprising an optical engine (10) to form a primary image and to convert the primary image into a plurality of input light beams (IN1), the apparatus (500) comprising the device (2) according to claim 4 form output light beams (OUT1) by diffractively expanding the input light beams (IN1).

13. A display apparatus (500) comprising an optical engine (10) to form a primary image and to convert the primary image into a plurality of input light beams (IN1), the apparatus (500) comprising the device (2) according to claim 5 form output light beams (OUT1) by diffractively expanding the input light beams (IN1).

14. A display apparatus (500) comprising an optical engine (10) to form a primary image and to convert the primary image into a plurality of input light beams (IN1), the apparatus (500) comprising the device (2) according to claim 6 form output light beams (OUT1) by diffractively expanding the input light beams (IN1).

15. A display apparatus (500) comprising an optical engine (10) to form a primary image and to convert the primary image into a plurality of input light beams (IN1), the apparatus (500) comprising the device (2) according to claim 7 form output light beams (OUT1) by diffractively expanding the input light beams (IN1).

16. A display apparatus (500) comprising an optical engine (10) to form a primary image and to convert the primary image into a plurality of input light beams (IN1), the apparatus (500) comprising the device (2) according to claim 8 form output light beams (OUT1) by diffractively expanding the input light beams (IN1).

17. A method comprising using the device (2) according to claim 1 to provide output light (OUT1).

18. A method comprising using the device (2) according to claim 1 to display an image.

* * * * *